(12) United States Patent
Kunzmann et al.

(10) Patent No.: US 12,206,671 B2
(45) Date of Patent: Jan. 21, 2025

(54) DATA MANAGEMENT FOR AUTHORIZING DATA CONSUMERS IN COMMUNICATION NETWORK

(71) Applicant: Nokia Technologies Oy, Espoo (FI)

(72) Inventors: Gerald Kunzmann, Augsburg (DE); Saurabh Khare, Bangalore (IN); Chaitanya Aggarwal, Munich (DE)

(73) Assignee: Nokia Technologies Oy, Espoo (FI)

( * ) Notice: Subject to any disclaimer, the term of this patent is extended or adjusted under 35 U.S.C. 154(b) by 220 days.

(21) Appl. No.: 17/737,576

(22) Filed: May 5, 2022

(65) Prior Publication Data

US 2022/0360584 A1 Nov. 10, 2022

(30) Foreign Application Priority Data

May 9, 2021 (IN) .............................. 202141020984

(51) Int. Cl.
*H04L 9/40* (2022.01)
(52) U.S. Cl.
CPC ............ *H04L 63/10* (2013.01); *H04L 63/126* (2013.01)
(58) Field of Classification Search
None
See application file for complete search history.

(56) References Cited

U.S. PATENT DOCUMENTS

| | | | |
|---|---|---|---|
| 9,734,220 B2* | 8/2017 | Karpi{hacek .......... | G06Q 10/08 |
| 9,911,134 B2* | 3/2018 | Gupta .................... | H04L 51/52 |
| 10,120,891 B2* | 11/2018 | Aslot .................. | G06F 16/2365 |
| 10,380,364 B2* | 8/2019 | Eda ........................ | H04L 63/205 |
| 10,452,768 B2* | 10/2019 | Pepper ................... | G06F 40/169 |
| 10,572,153 B2* | 2/2020 | Singhai ................. | G06F 3/0673 |
| 10,734,024 B1* | 8/2020 | Soni ....................... | G11B 27/28 |
| 10,936,585 B1* | 3/2021 | Echeverria ............ | G06F 16/258 |
| 11,003,627 B2* | 5/2021 | Soni ...................... | G06F 16/168 |
| 11,106,681 B2* | 8/2021 | Oliner ................... | G06F 16/248 |
| 11,429,931 B2* | 8/2022 | Mao ....................... | G06Q 10/10 |
| 11,563,743 B2* | 1/2023 | Liu ..................... | H04L 63/0876 |
| 11,564,086 B2* | 1/2023 | Nair .................... | H04W 12/033 |
| 11,573,971 B1* | 2/2023 | Cannon ................. | G06F 16/252 |
| 11,803,429 B2* | 10/2023 | Shuster ................. | G06F 21/629 |
| 2007/0073989 A1* | 3/2007 | Sharma ................. | G06F 1/3225 711/165 |
| 2008/0270410 A1* | 10/2008 | Palnau ................... | G06F 16/38 |

(Continued)

OTHER PUBLICATIONS

"3rd Generation Partnership Project; Technical Specification Group Services and System Aspects; Study on security aspects of enablers for Network Automation (eNA) for the 5G system (5GS) Phase 2; (Release 17)", 3GPP TR 33.866, V0.4.0, Mar. 2021, pp. 1-30.

"3rd Generation Partnership Project; Technical Specification Group Services and System Aspects; Architecture enhancements for 5G System (5GS) to support network data analytics services (Release 17)", 3GPP TS 23.288, V17.0.0, Mar. 2021, pp. 1-159.

(Continued)

*Primary Examiner* — Backhean Tiv
(74) *Attorney, Agent, or Firm* — Ryan, Mason & Lewis, LLP (57) ABSTRACT

Techniques for data management in a network entity to authorize data consumers in a communication network are disclosed. For example, a method comprises receiving, at a network entity of a communication network, data generated by a data producer in the communication network, and storing, at the network entity, the data generated by the data producer. The stored data has metadata, associated with the data producer, appended thereto.

22 Claims, 6 Drawing Sheets

(56) References Cited

U.S. PATENT DOCUMENTS

| | | | | |
|---|---|---|---|---|
| 2011/0265176 | A1* | 10/2011 | Khosrowpour | G06F 21/78 |
| | | | | 726/19 |
| 2014/0229447 | A1* | 8/2014 | Aslot | G06F 16/2365 |
| | | | | 707/688 |
| 2016/0036805 | A1* | 2/2016 | Lin | H04L 63/0876 |
| | | | | 726/5 |
| 2017/0308545 | A1* | 10/2017 | Soni | G06F 16/156 |
| 2020/0059976 | A1* | 2/2020 | Bhatia | H04W 8/005 |
| 2021/0065116 | A1* | 3/2021 | Mao | G06F 16/2282 |
| 2022/0138023 | A1* | 5/2022 | Shuster | G06F 11/0709 |
| | | | | 714/38.1 |
| 2022/0360584 | A1* | 11/2022 | Kunzmann | H04L 63/102 |
| 2023/0045417 | A1* | 2/2023 | Staufer | H04W 12/069 |
| 2023/0261474 | A1* | 8/2023 | Thorsen | H02J 3/381 |
| | | | | 700/286 |

OTHER PUBLICATIONS

"3rd Generation Partnership Project; Technical Specification Group Services and System Aspects; System architecture for the 5G System (5GS); Stage 2 (Release 17)", 3GPP TS 23.501, V17.0.0, Mar. 2021, pp. 1-489.

"3rd Generation Partnership Project; Technical Specification Group Services and System Aspects; Procedures for the 5G System (5GS); Stage 2 (Release 17)", 3GPP TS 23.502, V17.0.0, Mar. 2021, pp. 1-646.

"3rd Generation Partnership Project; Technical Specification Group Services and System Aspects; Security architecture and procedures for 5G system (Release 17)", 3GPP TS 33.501, V17.1.0, Mar. 2021, pp. 1-256.

* cited by examiner

DATA MANAGEMENT FOR AUTHORIZING DATA CONSUMERS IN COMMUNICATION NETWORK

FIELD

The field relates generally to communication networks, and more particularly, but not exclusively, to data management in such communication networks.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," and TS 23.502, entitled "Technical Specification Group Services and System Aspects; Procedures for the 5G System (5GS)," the disclosures of which are incorporated by reference herein in their entireties. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues associated with user equipment identifiers can present a significant challenge.

SUMMARY

Illustrative embodiments provide techniques for data management for authorizing data consumers in a communication network.

For example, in one illustrative embodiment, a method comprises receiving, at a network entity of a communication network, data generated by a data producer in the communication network, and storing, at the network entity, the data generated by the data producer. The stored data has metadata, associated with the data producer, appended thereto.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

Advantageously, illustrative embodiments provide that, even though a data request does not reach the actual data producer from which the data was originally collected, a network entity such as, by way of example only, an analytics data repository function, is able to ensure that the data consumer is authorized to request the data from a particular data producer by the presence of metadata appended to the collected data.

These and other features and advantages of embodiments described herein will become more apparent from the accompanying drawings and the following detailed description.

DETAILED DESCRIPTION

Embodiments will be illustrated herein in conjunction with example communication systems and associated techniques for security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other details that one of ordinary skill in the art will realize. For example, TS 23.288 entitled "Technical Specification Group Services and System Aspects; Architecture Enhancements for 5G System (5GS) to Support Network Data Analytics Services" and TR 33.866 entitled "Technical Specification Group Services and System Aspects; Study on Security Aspects of Enablers for Network Automation (eNA) for the 5G System (5GS) Phase 2;" the disclosures of which are incorporated by reference herein in their entireties, may also be mentioned below in the context of some illustrative embodiments. However, while well-suited for 5G-related 3GPP standards, embodiments are not necessarily intended to be limited to any particular standards.

Prior to describing illustrative embodiments, a general description of certain main components of a 5G network will be described below in the context of FIGS. 1 and 2.

Figure 1:
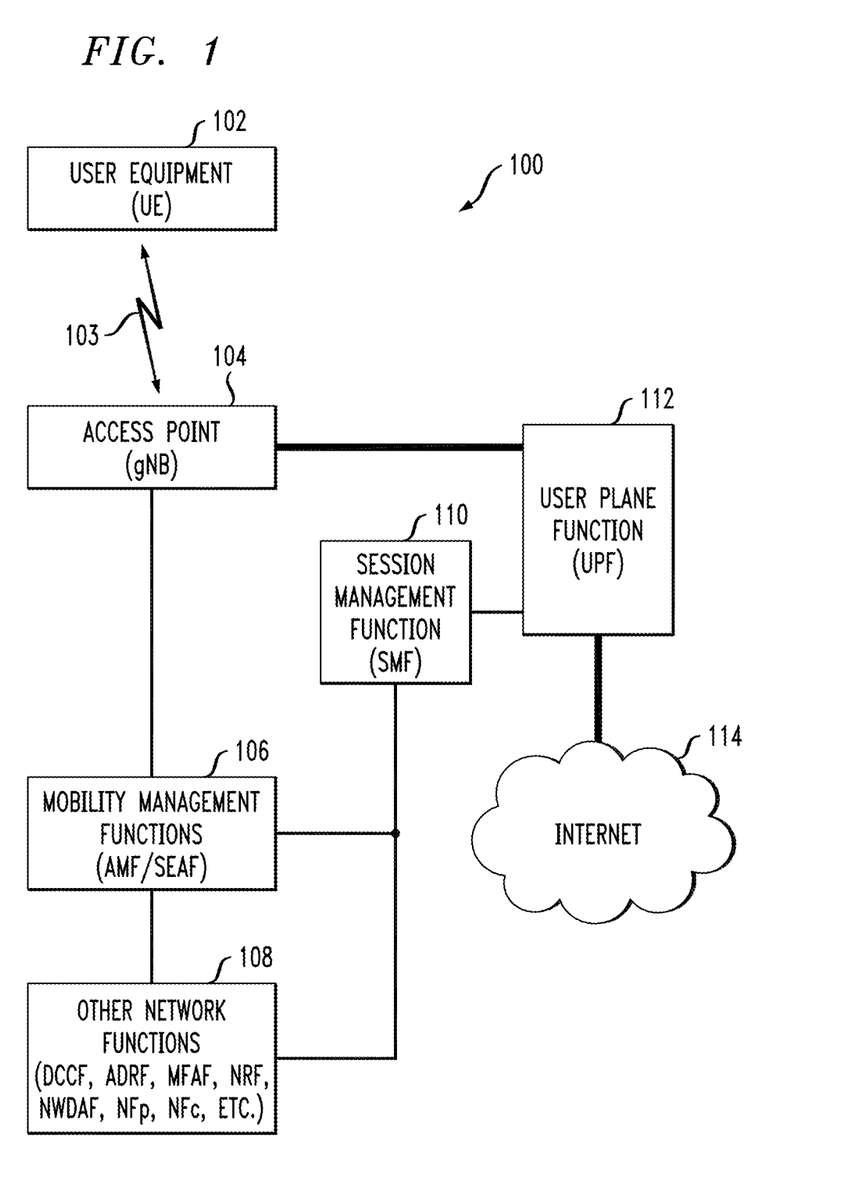
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, at least some functions that facilitate an explanation of illustrative embodiments are represented. Subsequent figures may depict some additional elements/functions (i.e., network entities).

Accordingly, as shown, communication system 100 comprises user equipment (UE) 102 that communicates via an air interface 103 with an access point (gNB) 104. It is to be understood that UE 102 may use one or more other types of access points (e.g., access functions, networks, etc.) to communicate with the 5G core other than a gNB. By way of example only, the access point 104 may be any 5G access network such as an N3IWF (Non-3GPP Interworking Function), a TNGF (Trusted Non-3GPP Gateway Function) or a W-AGF (Wireline Access Gateway Function) or may correspond to a legacy access point (e.g., eNB).

The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores a permanent subscription identifier and its related key, which are used to uniquely identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) unique to the UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI). Another example of a SUPI uses a Network Access Identifier (NAI). NAI is typically used for IoT communication.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to other network functions 108. As shown, some of these other network functions 108 include, but are not limited to, a Data Collection and Coordination Function (DCCF), an Analytics Data Repository Function (ADRF), a Messaging Framework Adapter Function (MFAF), a Network Repository Function (NRF), Network Data Analytics Function (NWDAF), and other network functions that can act as service producers (NFp) and/or service consumers (NFc). Note that any network function can be a service producer for one service and a service consumer for another service. Further, when the service being provided includes data, the data-providing NFp is referred to as a data producer, while the data-requesting NFc is referred to as a data consumer. A data producer may also be an NF that generates data by modifying or otherwise processing data produced by another NF.

Note that a UE, such as UE 102, is typically subscribed to what is referred to as a Home Public Land Mobile Network (HPLMN) in which some or all of the functions 106 and 108 reside. The HPLMN is also referred to as the Home Environment (HE). If the UE is roaming (not in the HPLMN), it is typically connected with a Visited Public Land Mobile Network (VPLMN) also referred to as a visited or serving network. In such case, some of the network functions 106 and 108 can reside in the VPLMN, in which case, functions in the VPLMN communicate with functions in the HPLMN as needed. However, in a non-roaming scenario, mobility management functions 106 and the other network functions 108 reside in the same communication network, i.e. HPLMN. Embodiments described herein are not limited by which functions reside in which PLMN (i.e., HPLMN or VPLMN).

The access point 104 is also operatively coupled (via one or more of functions 106 and/or 108) to a serving gateway function, i.e., Session Management Function (SMF) 110, which is operatively coupled to a User Plane Function (UPF) 112. UPF 112 is operatively coupled to a Packet Data Network, e.g., Internet 114. Note that the thicker solid lines in this figure denote a user plane (UP) of the communication network, as compared to the thinner solid lines that denote a control plane (CP) of the communication network. It is to be appreciated that network 114 in FIG. 1 may additionally or alternatively represent other network infrastructures including, but not limited to, cloud computing infrastructure and/or Edge computing infrastructure. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
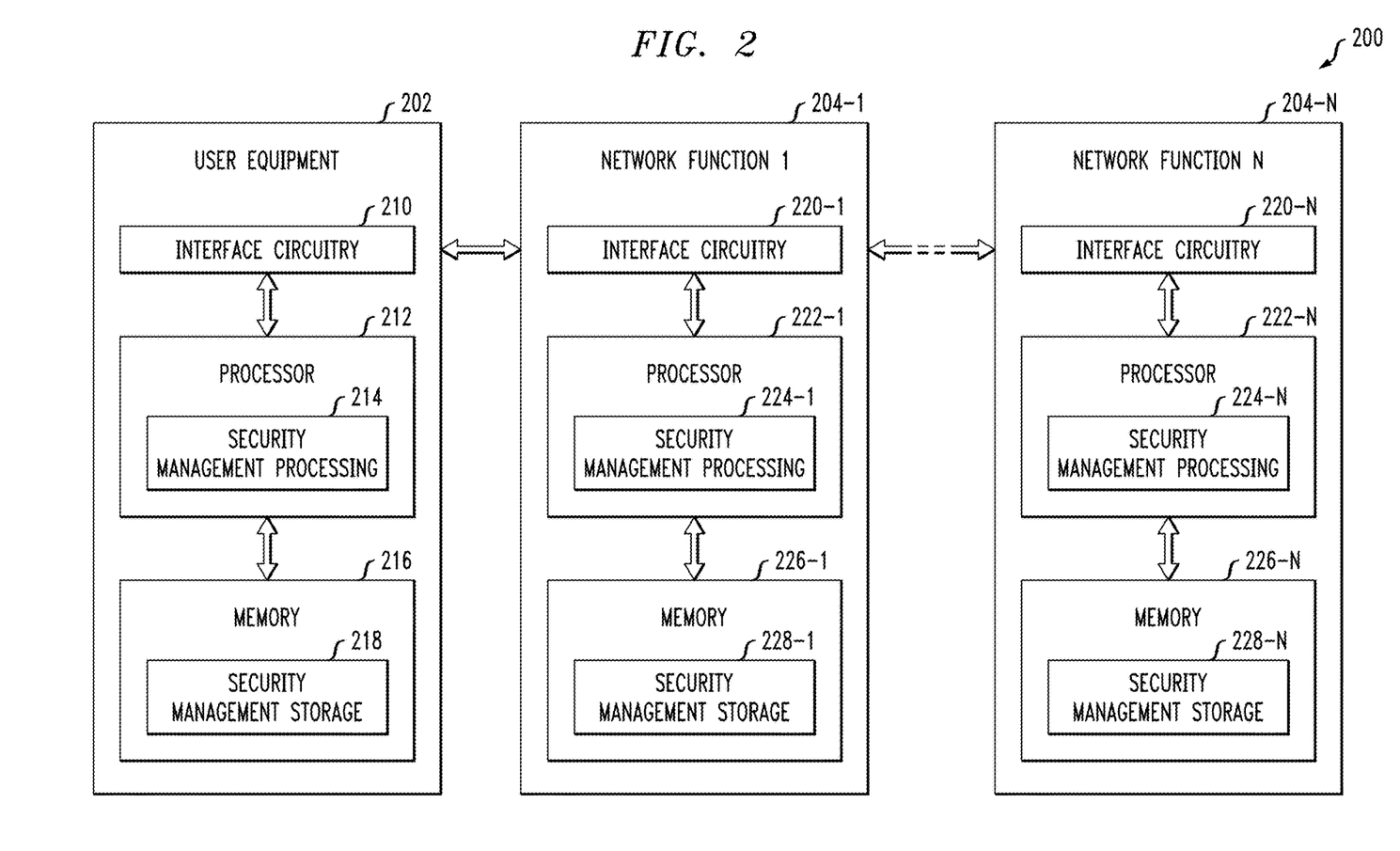
FIG. 2 illustrates user equipment and network entities with which one or more illustrative embodiments may be implemented.

FIG. 2 is a block diagram illustrating computing architectures for various participants in methodologies according to illustrative embodiments. More particularly, system 200 is shown comprising user equipment (UE) 202 and a plurality of network entities 204-1, . . . , 204-N. For example, in illustrative embodiments and with reference back to FIG. 1, UE 202 can represent UE 102, while network entities 204-1, . . . , 204-N can represent functions 106 and 108. It is to be appreciated that the UE 202 and network entities 204-1, . . . , 204-N are configured to interact to provide security management and other techniques described herein.

The user equipment 202 comprises a processor 212 coupled to a memory 216 and interface circuitry 210. The processor 212 of the user equipment 202 includes a security management processing module 214 that may be implemented at least in part in the form of software executed by the processor. The processing module 214 performs security management described in conjunction with subsequent figures and otherwise herein. The memory 216 of the user equipment 202 includes a security management storage module 218 that stores data generated or otherwise used during security management operations.

Each of the network entities (individually or collectively referred to herein as 204) comprises a processor 222 (222-1, . . . , 222-N) coupled to a memory 226 (226-1, . . . , 226-N) and interface circuitry 220 (220-1, . . . , 220-N). Each processor 222 of each network entity 204 includes a security management processing module 224 (224-1, . . . , 224-N) that may be implemented at least in part in the form of software executed by the processor 222. The processing module 224 performs security management operations described in conjunction with subsequent figures and otherwise herein. Each memory 226 of each network entity 204 includes a security management storage module 228 (228-1, . . . , 228-N) that stores data generated or otherwise used during security management operations.

The processors 212 and 222 may comprise, for example, microprocessors such as central processing units (CPUs), application-specific integrated circuits (ASICs), digital signal processors (DSPs) or other types of processing devices, as well as portions or combinations of such elements.

The memories 216 and 226 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 and 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

Further, the memories 216 and 226 may more particularly comprise, for example, electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 illustratively comprise transceivers or other communication hardware or firmware that allows the associated system elements to communicate with one another in the manner described herein.

It is apparent from FIG. 2 that user equipment 202 and plurality of network entities 204 are configured for communication with each other as security management participants via their respective interface circuitries 210 and 220. This communication involves each participant sending data to and/or receiving data from one or more of the other participants. The term "data" as used herein is intended to be construed broadly, so as to encompass any type of information that may be sent between participants including, but not limited to, identity data, key pairs, key indicators, security management messages, registration request/response messages and data, request/response messages, authentication request/response messages and data, metadata, control data, audio, video, multimedia, other messages, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as gNB 104, SMF 110, and UPF 112 may each be configured to include components such as a processor, memory and network interface. These elements need not be implemented on separate stand-alone processing platforms, but could instead, for example, represent different functional portions of a single common processing platform.

More generally, FIG. 2 can be considered to represent processing devices configured to provide respective security management functionalities and operatively coupled to one another in a communication system.

As mentioned above, the 3GPP TS 23.501 defines the 5G system architecture as service-based, e.g., Service-Based Architecture (SBA). It is realized herein that in deploying different NFs, there can be many situations where an NF may need to interact with an entity external to the SBA-based 5G core network (e.g., including the corresponding PLMN(s), e.g., HPLMN and VPLMN). Thus, the term "internal" as used herein illustratively refers to operations and/or communications within the SBA-based 5G core network (e.g., SBA-based interfaces) and the term "external" illustratively refers to operations and/or communications outside the SBA-based 5G core network (non-SBA interfaces).

Given the above general description of some features of a 5G network, problems with existing security (e.g., data consumer authorization) approaches and solutions proposed in accordance with illustrative embodiments will now be described herein below.

Currently, as specified in the above-referenced TS 23.288, the ADRF can be used to store historical data or analytics that can be requested later by a data consumer. However, this leads to the following authorization issues.

In the normal DCCF or any consumer-producer scenario, the data request is sent to the data producer, which then verifies that the data consumer has the access token containing the same target NF type or NF ID (identifier) as the data producer, and only after successful verification, will the data producer send the data.

In a scenario with an ADRF, the data producer may store the data in ADRF for historical use (this can be triggered, e.g., by DCCF). Now, a data consumer can request data from the DCCF, and if the data is already stored in ADRF, DCCF directly sends a request to ADRF to send the stored data to the data consumer. In this scenario, since the access token cannot be verified by the data producer (because the request is directly handled by ADRF), a data consumer with a valid/invalid access token for any target NF type/NF ID, can request data from ADRF, even when the data consumer is not authorized to do so. There is no mechanism currently defined to prevent such unauthorized data retrieval.

Another problem foreseen herein in 6G use cases is with the huge amount of data collected by different NFs, enterprises, vendors, etc. and that is stored for long periods of time (e.g. years). For example, assume user 1 data is collected by AMF-operator 1, AMF sends it to NWDAF. NWDAF sends it to AF/enterprise company (outside 3GPP) where it is stored for two to three years. If after two to three years, some dispute occurs on the privacy, e.g., user 1 inquires why the company/enterprise has collected it's data, then it is realized herein that there should be a trackability which points to operator and the NF/node that generated/collected the data at some time. However, currently there is no mechanism to add the data source along with the data stored.

Illustrative embodiments overcome the above and other issues associated with existing data collection and authorization techniques. By way of example, illustrative embodiments provide that data producers, when sending the data to ADRF (or any other network entity or location) for storage, also append metadata. By way of example, the metadata can include, but is not limited to, NF type of the data source, NF ID of the data source, operator name of the data source, PLMN ID, NSSAI ID (i.e., slice identifier), etc.

Therefore, advantageously, data which is stored in the ADRF is enhanced to also contain some metadata such as the NF type and identifier of the data producer from which the data is collected. This metadata can either be added directly by the data producer or via the DCCF, MFAF, or ADRF. Furthermore in illustrative embodiments, when ADRF receives a data request from a data consumer via DCCF, ADRF verifies the access token which was generated by the NRF, but now besides checking its own target NF type or NF ID in the access token, it also checks the NF type and the NF Instance ID of the data producer present in the access token against the metadata that had been provided by the data producer during the data collection or stored by DCCF, MFAF or ADRF during the data collection. Also, when additional metadata (examples of which are given above and below) is appended and stored with the data in ADRF, ADRF also matches all or portions of such metadata against the access token claims information presented by the NF consumer. Only after a successful verification does ADRF provide the historical data to the data consumer. Otherwise, ADRF rejects the request.

Thus, even though the data request does not reach the actual data producer from which the data was originally collected, ADRF is able to ensure that the data consumer is authorized to request the data from a particular data producer by the presence of new metadata parameters in the collected data.

In further illustrative embodiments, additional metadata can be appended and stored such as a privacy indication and/or a vendor ID. A privacy indication indicates if the data is considered "sensitive/privacy-related." Such metadata allows more easy handling of the data, e.g., ADRF could filter by this parameter to find all sensitive data, as such data might need specific handling. Still further, such indication can be configured to be even more generic to hold any kind of characteristics/properties (e.g., subject to user consent, location data, anonymized data) of the data to be stored in ADRF, and not just indicating that data is "sensitive" or "privacy-related." For example, certain consumers might not be authorized to access such data flagged as sensitive or subject to user consent, while other consumers can only access data that is explicitly marked as "anonymized" Furthermore, vendor ID indicates the vendor of the NF producer that will be responsible for pushing the data (or machine learning models) to ADRF.

By way of example, assume an NF service consumer (e.g., NWDAF) accesses the services of DCCF using the existing SBI mechanisms. NF service producer (or data producer) when sending the data to the NF service consumer, may also send the data to ADRF for storage and archiving if requested/subscribed to by ADRF (e.g., based on a requested by the NF service consumer or DCCF). Alternatively, the Messaging Framework (MFAF) may be configured by DCCF to forward a copy of the data to ADRF.

The NF service producer (data producer), when sending the data to the ADRF also appends its own NF type and its own NF Instance ID as metadata to the data which is sent for archiving. If NF service producer does not add this metadata, then DCCF (or MFAF) may add this information before sending it to the ADRF. Alternatively, ADR can append this metadata on its own.

The access token get request sent from DCCF, or any NF consumer, to NRF to request the desired data on behalf of the NF service consumer contains the following information: NF Instance IDs of the NF Service Consumer (e.g., NWDAF) and DCCF, NF Type (or NF Instance ID) of the NF service producers (i.e., ADRF and the data producer).

NRF after verifying the request, authorizes the NF service consumer to request the data and adds in the access token claims the NF Type (or the NF Instance ID) of the NF service producers (i.e. ADRF and the data producer).

The ADRF when receiving the request from DCCF (based on a request from the NF service consumer) verifies the access token generated by ensuring that the NF Type (or NF Instance ID) matches that of ADRF, and the NF Type (or NF Instance ID) of the data producer matches the metadata information that was earlier appended by the data producer (or DCCF or MFAF) when archiving the data. Only after a successful verification, ADRF sends the data to the NF service consumer via DCCF (or MFAF).

Various illustrative embodiments are depicted in the message flow diagrams of FIGS. 3A through 4B and will now be described below.

Figure 3A:
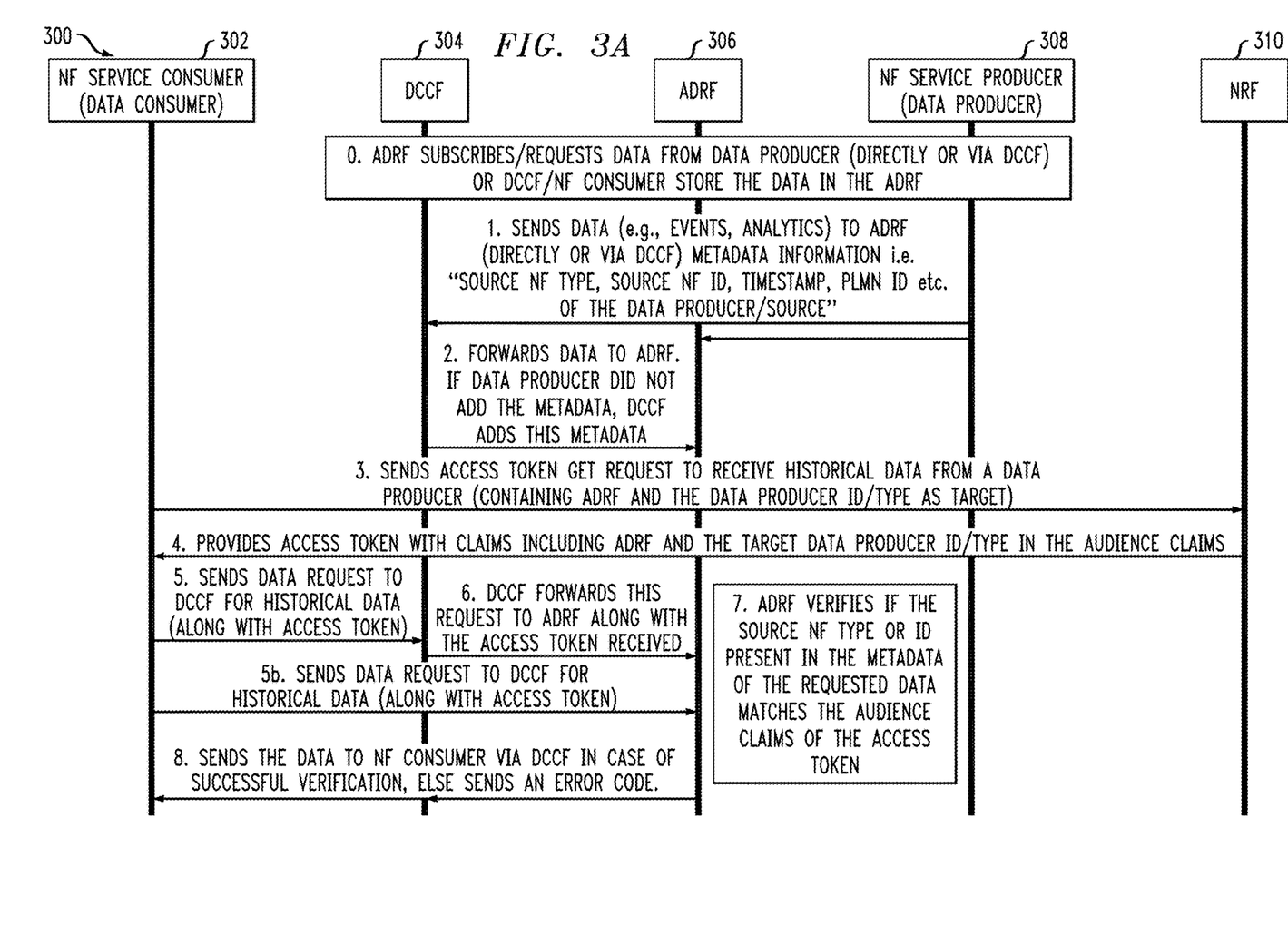
FIG. 3A illustrates a process for data consumer authorization via an analytic data repository without messaging framework according to an illustrative embodiment.

FIG. 3A illustrates a process 300 for service consumer authorization via a analytic data repository without messaging framework according to an illustrative embodiment. Process 300 comprises steps/operations executed by, and message/call flows between, an NF Service Consumer (Data Consumer) 302, a DCCF 304, an ADRF 306, an NF Service Producer (Data Producer) 308, and an NRF 310. It is to be appreciated that any messages and parameters not in the focus of this disclosure are not shown or discussed for the sake of simplicity. Those of ordinary skill in the art will appreciate the operation and functioning of any such messages and parameters. The steps below correspond to the numbers referenced in the figure for the steps/operations associated with process 300.

Step 0. ADRF 306 subscribes/requests data (e.g., event analytics) from Data Producer 308 (directly or via DCCF 304).

Step 1. Data Producer 308, when instructed either by the Data Consumer 302 or by DCCF 304 (due to internal configuration), stores the data into ADRF 306 (directly or via DCCF 304) and adds metadata information such as, e.g., but not limited to: (i) data source NF Type; (ii) data source NF ID (Instance ID or Set ID); (iii) Time stamp; (iv) Operator name; and (v) PLMN ID.

This metadata information can be pegged along with the data notification (JavaScript Object Notation (JSON) body) or as a separate custom header. This information is sufficient to identity the data source in the future. For example, UE1 mobility data (location of UE1) is collected by the AMF, then AMF sends a notification with custom header with data source details such as, e.g.: (i) data source NF type: AMF; (ii) Data-source NF Id: AMF ID; (iii) Time stamp: 123; (iv) Operator name: Vodafone; and (v) PLMN ID: abcde.

Step 2. If, in step 1, the data is sent via DCCF 304 and the Data Producer 308 did not add its metadata, then DCCF 304 when forwarding the data to ADRF 306, adds the metadata of the Data Producer 308 prior to sending the data to ADRF 306 for storage. Alternatively, ADRF 306 collects this information via other elements of the message and stores it along with the data (notification).

Steps 3 and 4. Data Consumer 302 sends request to NRF 310 for access token request to collect historical data from a data producer and adds NF Type or NF ID belonging to data producers and ADRF 306. NRF 310 then, after verification, provides an access token containing ADRF 306, data producer NF Type/ID, and DCCF 304 in the audience claims of the access token.

Steps 5 and 6. DCCF 304 first verifies via the audience claim if the Data Consumer 302 is authorized to access the services of DCCF 304, and then forwards the historical data request to ADRF 306.

Step 5b. If the request to collect historical data can go directly to ADRF 306 without DCCF 304, then DCCF 304 related claims are not required.

Step 7. ADRF 306 now performs two verifications. First, it checks if the audience claim is matching its own type. Second, ADRF 306 verifies if the Source NF type or ID (Instance ID or Set ID) present in the metadata of the requested data matches the audience claims of the access token. As the metadata information contains PLMN ID, ADRF 306 can also check that matches before providing the data.

Step 8. ADRF 306 now sends the data to Data Consumer 302 via DCCF 304 in case of successful verification, else sends an error code.

If ADRF 306 is modifying the data via a filtering/processing instruction, then ADRF 306 also adds its own Data Source header/Metadata information along with the existing Data Source header while sending the data to Data Consumer 302.

Whichever entity stores the data (e.g., 3GPP NF or entity external to 3GPP), they store the data along with the customer header information of the data source, so that future data generation tracking is available. Furthermore, any 3GPP NF or any technology implementing one or more illustrative embodiments follows a similar mechanism, i.e.:
  (i) whichever entity is generating the data, generate additional information of data source;

(ii) whichever entity is modifying the data, add information of modification;
(iii) whichever entity is storing the data, store these additional information;
as such, data generation and modification can be tracked in the future.

Figure 3B:
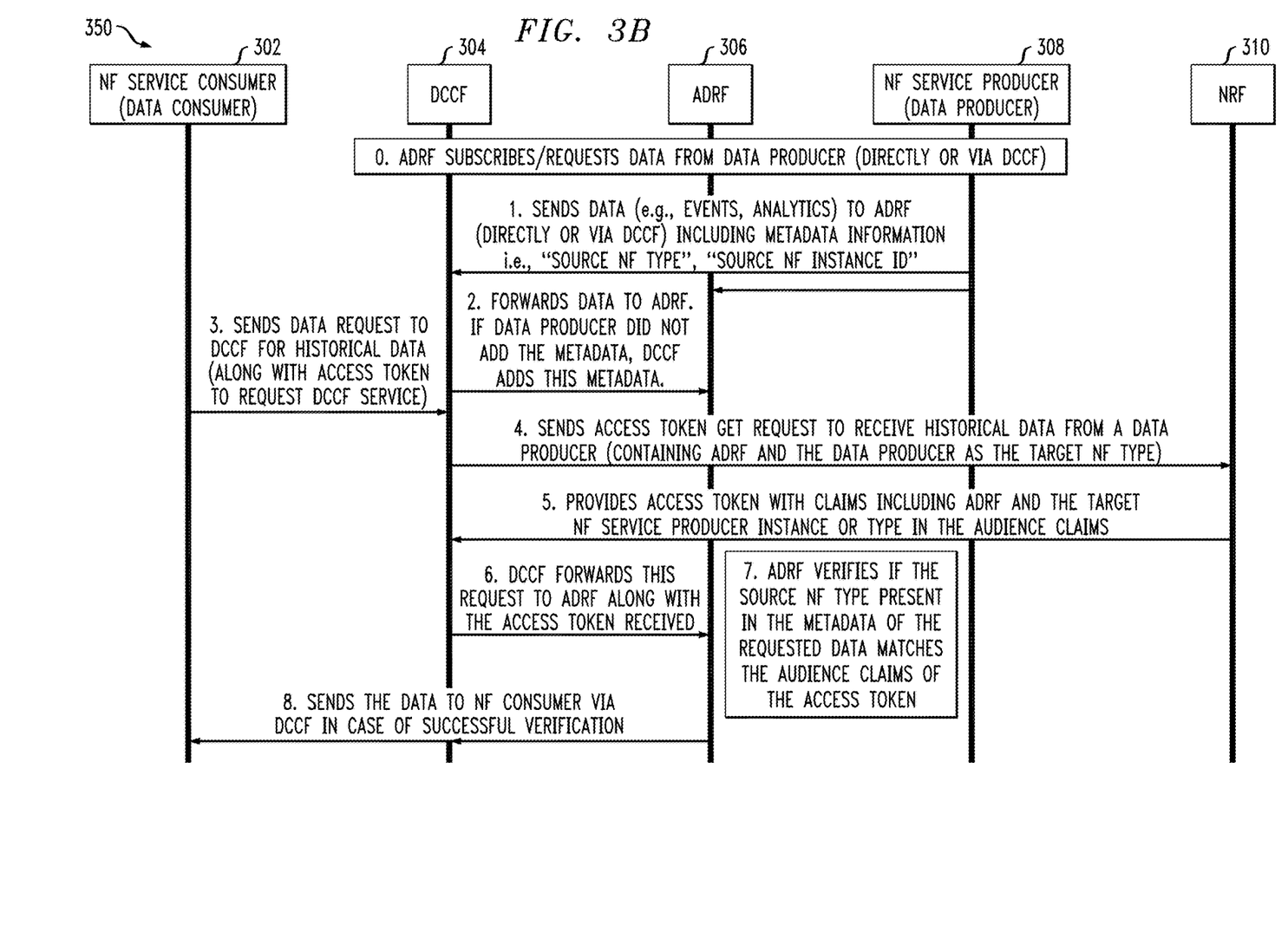
FIG. 3B illustrates a process for data consumer authorization via an analytic data repository without messaging framework according to another illustrative embodiment.

FIG. 3B illustrates a process 350 for service consumer authorization via an analytic data repository without messaging framework according to another illustrative embodiment. Process 350 is a variation of process 300 of FIG. 3A and thus comprises steps/operations executed by, and message/call flows between, an NF Service Consumer (Data Consumer) 302, a DCCF 304, an ADRF 306, an NF Service Producer (Data Producer) 308, and an NRF 310. It is to be appreciated that any messages and parameters not in the focus of this disclosure are not shown or discussed for the sake of simplicity. Those of ordinary skill in the art will appreciate the operation and functioning of any such messages and parameters. The steps below correspond to the numbers referenced in the figure for the steps/operations associated with process 350.

Step 0. ADRF 306 subscribes/requests data from Data Producer 308 (directly or via DCCF 304).

Step 1. Data Producer 308 sends the data to ADRF 306 (directly or via DCCF 304) and may add metadata information containing Source NF Type as its own NF Type and Source NF Instance ID as its own Instance ID.

Step 2. If, in step 1, the data is sent via DCCF 304 and the Data Producer 308 did not add its metadata, then DCCF 304 when forwarding the data to ADRF 306, adds the metadata related to the Data Producer 308 (i.e., NF type and NF Instance ID) prior to sending the data to ADRF 306 for storage.

Step 3. Data Consumer 308 sends request to DCCF 304 to get historical data (as specified in the above-referenced TS 23.288) with also optionally providing the NF Type (or NF Instance ID) of the target NF Service Producer (e.g., Data Producer 308). The request also contains the access token to request services from DCCF 304.

Step 4. DCCF 304, after verifying that the Data Consumer 302 is authorized to access the services of DCCF 304, sends to NRF an access token request to collect historical data from data producer(s) providing the NF type (or NF Instance ID(s)) of the data producer(s).

Step 5. NRF 310, after verification, provides an access token containing ADRF NF Type (or NF Instance ID) and data producer NF Type (or NF Instance ID(s)) in the audience claims of the access token.

Step 6. DCCF 304 forwards the historical data request to ADRF 306 along with the access token received.

Step 7. ADRF 306 now performs two verifications. First, it checks if an audience claim is matching its own NF type (or NF Instance ID). Second, ADRF 306 verifies if the Source NF type (or NF Instance ID) present in the metadata of the requested data matches an audience claim of the access token.

Step 8. ADRF 306 sends the data to Data Consumer 302 via DCCF 304 in case of successful verification.

Figure 4A:
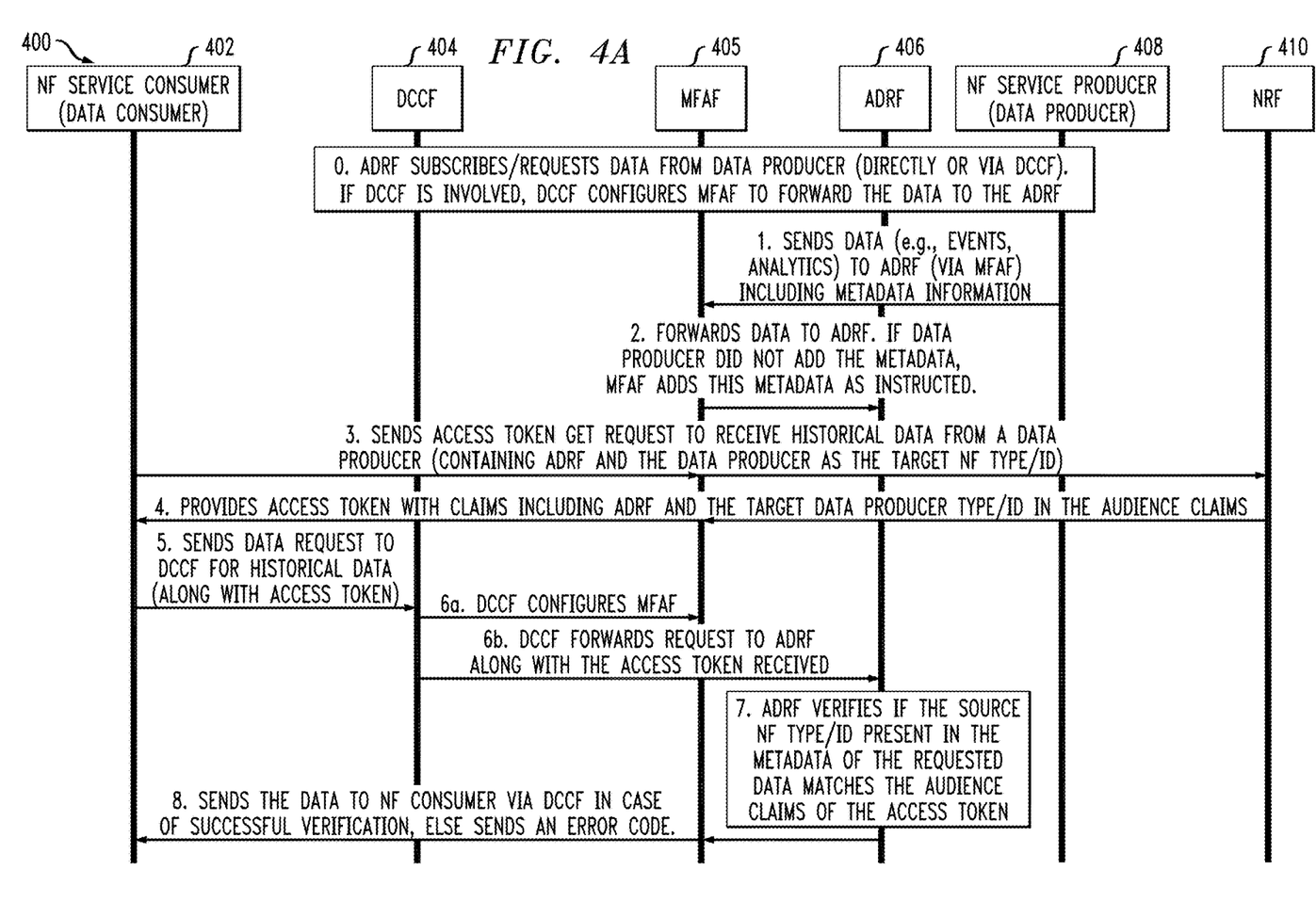
FIG. 4A illustrates a process for data consumer authorization via an analytic data repository with messaging framework according to an illustrative embodiment.

FIG. 4A illustrates a process 400 for service consumer authorization via an analytic data repository with messaging framework according to an illustrative embodiment. Process 400 comprises steps/operations executed by, and message/call flows between, an NF Service Consumer (Data Consumer) 402, a DCCF 404, an MFAF 405, an ADRF 406, an NF Service Producer (Data Producer) 408, and an NRF 410. It is to be appreciated that any messages and parameters not in the focus of this disclosure are not shown or discussed for the sake of simplicity. Those of ordinary skill in the art will appreciate the operation and functioning of any such messages and parameters. The steps below correspond to the numbers referenced in the figure for the steps/operations associated with process 400. Note that process 400 is similar to process 300 of FIG. 3A with the additional aspect that DCCF 404 configures MFAF 405 to forward the data to ADRF 406 and adds metadata information of the Data Producer 408 once data is received.

Step 0. ADRF 406 subscribes/requests data (e.g., event analytics) from Data Producer 408 (directly or via DCCF 404).

Steps 1 and 2. Data Producer 408 sends the data to MFAF 405 which stores the data into ADRF 406 and adds metadata information as described above.

Steps 3 and 4. Data Consumer 402 sends request to NRF 410 for access token request to collect historical data from a data producer and adds NF Type or NF ID belonging to data producers and ADRF 406. NRF 410 then, after verification, provides an access token containing ADRF 406, data producer NF Type/ID, and DCCF 304 in the audience claims of the access token.

Steps 5. Data Consumer 402 sends the historical data request to DCCF 404 along with the access token.

Step 6a. DCCF 404 configures MFAF 405.

Step 6b. DCCF 404 first verifies via the audience claim if the Data Consumer 402 is authorized to access the services of DCCF 404, and then forwards the historical data request to ADRF 406.

Step 7. ADRF 406 now performs two verifications. First, it checks if the audience claim is matching its own type. Second, ADRF 406 verifies if the Source NF type or ID (Instance ID or Set ID) present in the metadata of the requested data matches the audience claims of the access token. As the metadata information contains PLMN ID, ADRF 406 can also check that matches before providing the data.

Step 8. ADRF 406 now sends the data to Data Consumer 402 via MFAF 405 in case of successful verification, else sends an error code.

If ADRF 406 is modifying the data via a filtering/processing instruction, then ADRF 406 also adds its own Data Source header/Metadata information along with the existing Data Source header while sending the data to Data Consumer 402.

Figure 4B:
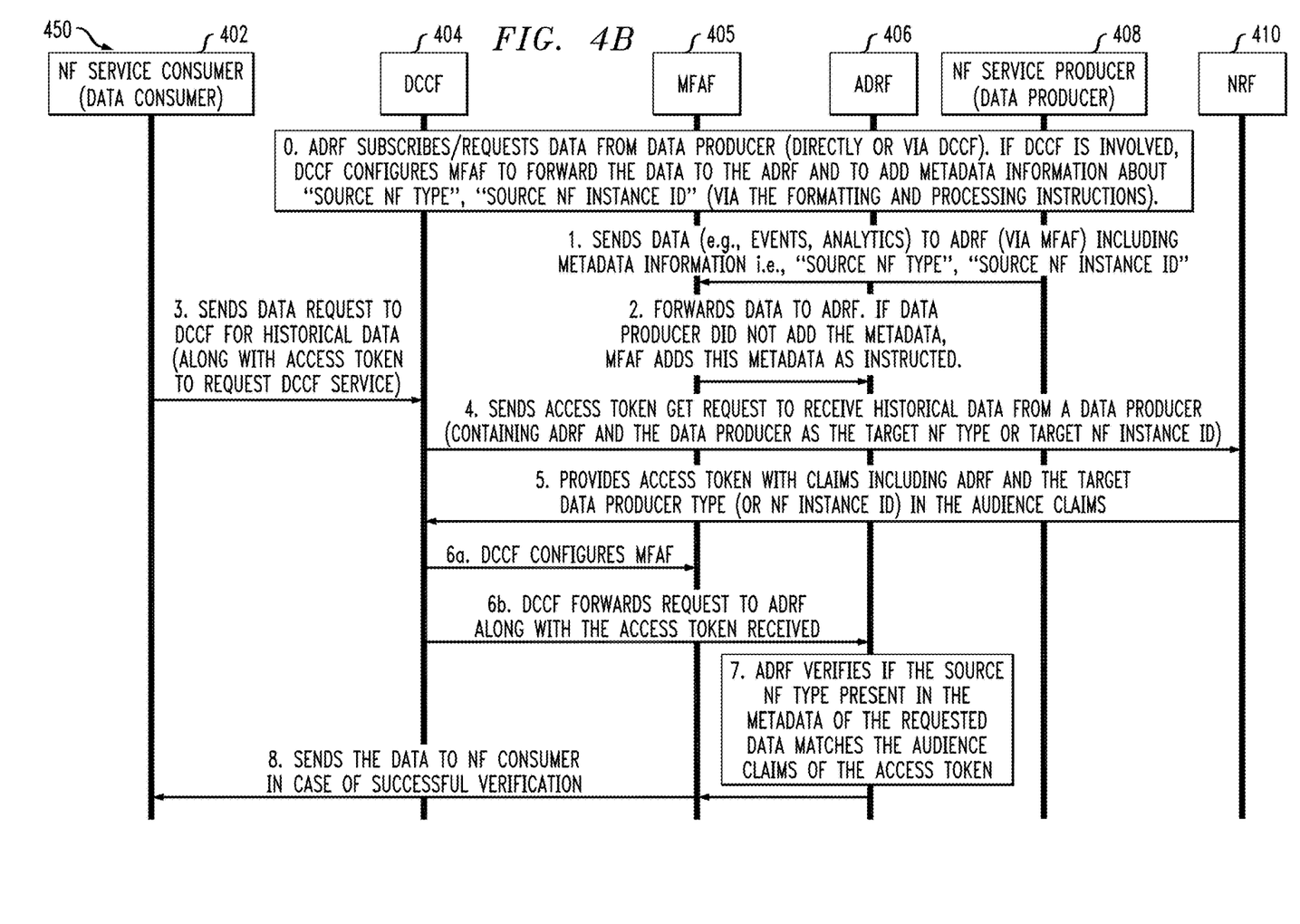
FIG. 4B illustrates a process for data consumer authorization via analytic an data repository with messaging framework according to another illustrative embodiment.

FIG. 4B illustrates process 450 for service consumer authorization via analytic data repository with messaging framework according to another illustrative embodiment. Process 450 is a variation of process 400 of FIG. 4A and thus comprises steps/operations executed by, and message/call flows between, an NF Service Consumer (Data Consumer) 402, a DCCF 404, an MFAF 405, an ADRF 406, an NF Service Producer (Data Producer) 408, and an NRF 410. It is to be appreciated that any messages and parameters not in the focus of this disclosure are not shown or discussed for the sake of simplicity. Those of ordinary skill in the art will appreciate the operation and functioning of any such messages and parameters. The steps below correspond to the numbers referenced in the figure for the steps/operations associated with process 450.

Step 0. ADRF 406 subscribes/requests data from Data Producer 408 (directly or via DCCF 404). If DCCF 404 is involved, DCCF 404 configures MFAF 405 to forward the data to ADRF 406 and to add metadata information containing Source NF Type as the NF Type of the Data Producer and source NF Instance ID as NF Instance ID of the data producer (if the data producer does not append this metadata information).

Step 1. Data Producer 408 sends the data to ADRF 406 (directly or via DCCF 404) and may add metadata information containing Source NF Type as its own NF Type and Source NF Instance ID as its own Instance ID.

Step 2. If Data Producer 408 did not add its metadata, then MFAF 405 when forwarding the data to ADRF 406, adds the metadata related to the data producer (i.e., NF type and NF Instance ID) (as instructed by DCCF 404 in step 0) prior to sending the data to ADRF 406 for storage.

Step 3. Data Consumer 402 sends request to DCCF 404 to get historical data (as specified in the above-referenced TS 23.288) with also optionally providing the NF Type (or NF Instance ID) of the target NF Service Producer (or data producer). The request also contains the access token to request services from DCCF 404.

Step 4. DCCF 404 after verifying that the Data Consumer 402 is authorized to access services of DCCF 404, sends to NRF 410 an access token request to collect historical data from data producer(s) providing the NF type (or NF Instance ID) of the data producers.

Step 5. NRF 410, after verification, provides an access token containing ADRF NF Type (or NF Instance ID) and data producer NF Type (or NF Instance ID(s)) in the audience claims of the access token.

Steps 6a/6b. DCCF 404 forwards the historical data request to ADRF 406 along with the access token received. DCCF 404 also configures the MFAF 405 to forward the data to Data Consumer 402.

Step 7. ADRF 406 now performs two verifications. First, it checks if an audience claim is matching its own NF type (or NF Instance ID). Second, ADRF 406 verifies if the Source NF type (or NF Instance ID) present in the metadata of the requested data matches an audience claim of the access token.

Step 8. ADRF 406 sends the data to Data Consumer 402 via MFAF 405 in case of successful verification, else sends an error code.

As used herein, it is to be understood that the term "communication network" in some embodiments is intended to comprise two or more separate communication networks such that a network entity that collects and stores data may be external to (outside of) the communication network of a data producer.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

We claim:

1. An apparatus comprising:
at least one processor;
at least one memory including computer program code;
the at least one memory and the computer program code being configured to, with the at least one processor, cause the apparatus at least to;
receive, by a first network entity in a communication network, data from a second network entity in the communication network, the data being generated by a data producer in the communication network;
storing, by the first network entity, the data generated by the data producer, wherein the stored data has metadata, associated with the data producer, appended thereto;
receive, by the first network entity, a request for access to the stored data from a third network entity in the communication network, the third network entity comprising a data consumer; and
validate, by the first network entity utilizing the appended metadata, the request for access to the stored data received from the third network entity.

2. The apparatus of claim 1, wherein the appended metadata comprises a type and an identifier of the data producer.

3. The apparatus of claim 1, wherein the appended metadata comprises one or more of a time stamp, identifying data associated with the communication network, identifying information associated with an operator of the communication network, identifying information associated with a network slice, and identifying information associated with a vendor of the data producer.

4. The apparatus of claim 1, wherein the appended metadata comprises an indication of one or more characteristics of the data.

5. The apparatus of claim 1, wherein the appended metadata comprises identifying information associated with any network entity of the communication network that modified the data.

6. The apparatus of claim 1, wherein the request for access to the stored data received from the third network entity comprises an access token.

7. The apparatus of claim 6, wherein validating the request for access to the stored data received from the third network entity comprises verifying that at least a portion of information in the access token matches at least a portion of the appended metadata.

8. The apparatus of claim 7, wherein the at least one memory and the computer program code are further configured to, with the at least one processor, cause the apparatus to:
send at least a portion of the stored data to the third network entity upon successful verification of the access token; and
send an error message to the third network entity upon unsuccessful verification of the access token.

9. The apparatus of claim 1, wherein the second network entity is different than the data producer, and wherein the metadata associated with the data producer is provided by the second network entity.

10. The apparatus of claim 1, wherein the first network entity comprises an Analytics Data Repository Function (ADRF) and the second network entity comprises a Data Collection and Coordination Function (DCCF).

11. A method comprising:
receiving, at a first network entity in a communication network, data from a second network entity in the communication network, the data being generated by a data producer in the communication network;

storing, by the first network entity, the data generated by the data producer, wherein the stored data has metadata, associated with the data producer, appended thereto;

receiving, by the first network entity, a request for access to the stored data from a third network entity in the communication network, the third network entity comprising a data consumer; and validating, by the first network entity utilizing the appended metadata, the request for access to the stored data received from the third network entity.

12. The method of claim 11, wherein the appended metadata comprises a type and an identifier of the data producer.

13. The method of claim 11, wherein the appended metadata comprises one or more of a time stamp, identifying data associated with the communication network, identifying information associated with an operator of the communication network, identifying information associated with a network slice, and identifying information associated with a vendor of the data producer.

14. The method of claim 11, wherein the appended metadata comprises an indication of one or more characteristics of the data.

15. The method of claim 11, wherein the appended metadata comprises identifying information associated with any network entity of the communication network that modified the data.

16. The method of claim 9, wherein the request for access to the stored data received from the third network entity comprises an access token.

17. The method of claim 16, wherein validating the request for access to the stored data received from the third network entity comprises verifying that at least a portion of information in the access token matches at least a portion of the metadata.

18. The method of claim 17, further comprising:
sending, from the first network entity to the third network entity, at least a portion of the stored data upon successful verification of the access token; and
sending, from the first network entity to the third network entity, an error message upon unsuccessful verification of the access token.

19. The method of claim 11, wherein the first network entity comprises an analytics data repository function.

20. An article of manufacture comprising a non-transitory computer-readable storage medium having embodied therein executable program code that when executed by a processor causes the processor to perform the steps of:

receiving, at a first network entity in a communication network, data from a second network entity in the communication network, the data being generated by a data producer in the communication network;

storing, by the first network entity, the data generated by the data producer, wherein the stored data has metadata, associated with the data producer, appended thereto;

receiving, by the first network entity, a request for access to the stored data from a third network entity in the communication network, the third network entity comprising a data consumer; and validating, by the first network entity utilizing the appended metadata, the request for access to the stored data received from the third network entity.

21. The article of manufacture of claim 20, wherein the appended metadata comprises a type and an identifier of the data producer.

22. The article of manufacture of claim 20, wherein the appended metadata comprises one or more of a time stamp, identifying data associated with the communication network, identifying information associated with the operator of the communication network, identifying information associated with a network slice, and identifying information associated with a vendor of the data producer.

* * * * *